Figure 1:
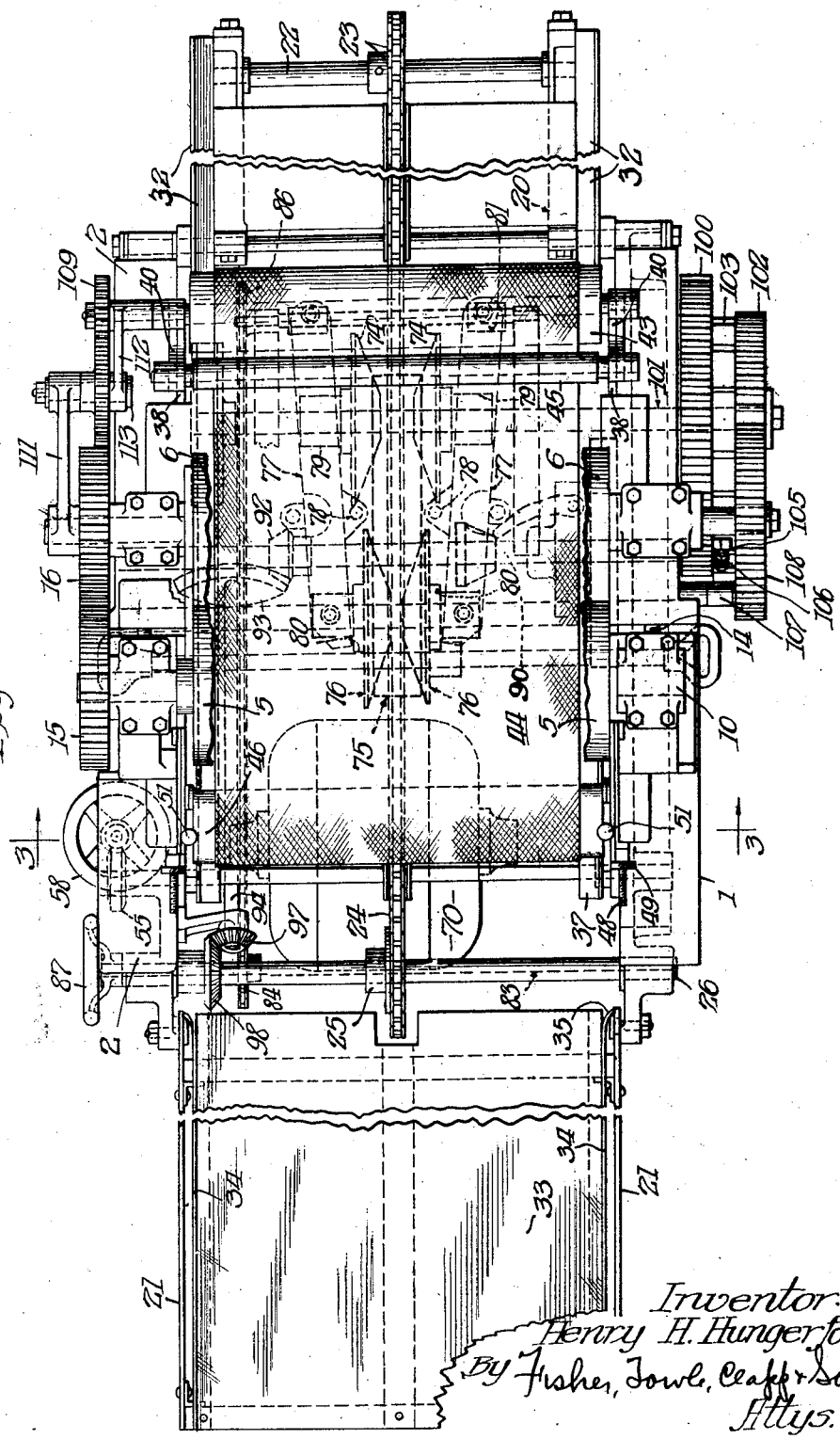

April 2, 1929.     H. H. HUNGERFORD     1,707,477

CUTTING AND PANSKIP MACHINE

Filed June 8, 1923     6 Sheets-Sheet 1

Inventor:
Henry H. Hungerford,
By Fisher, Towle, Clapp & Soans
Attys.

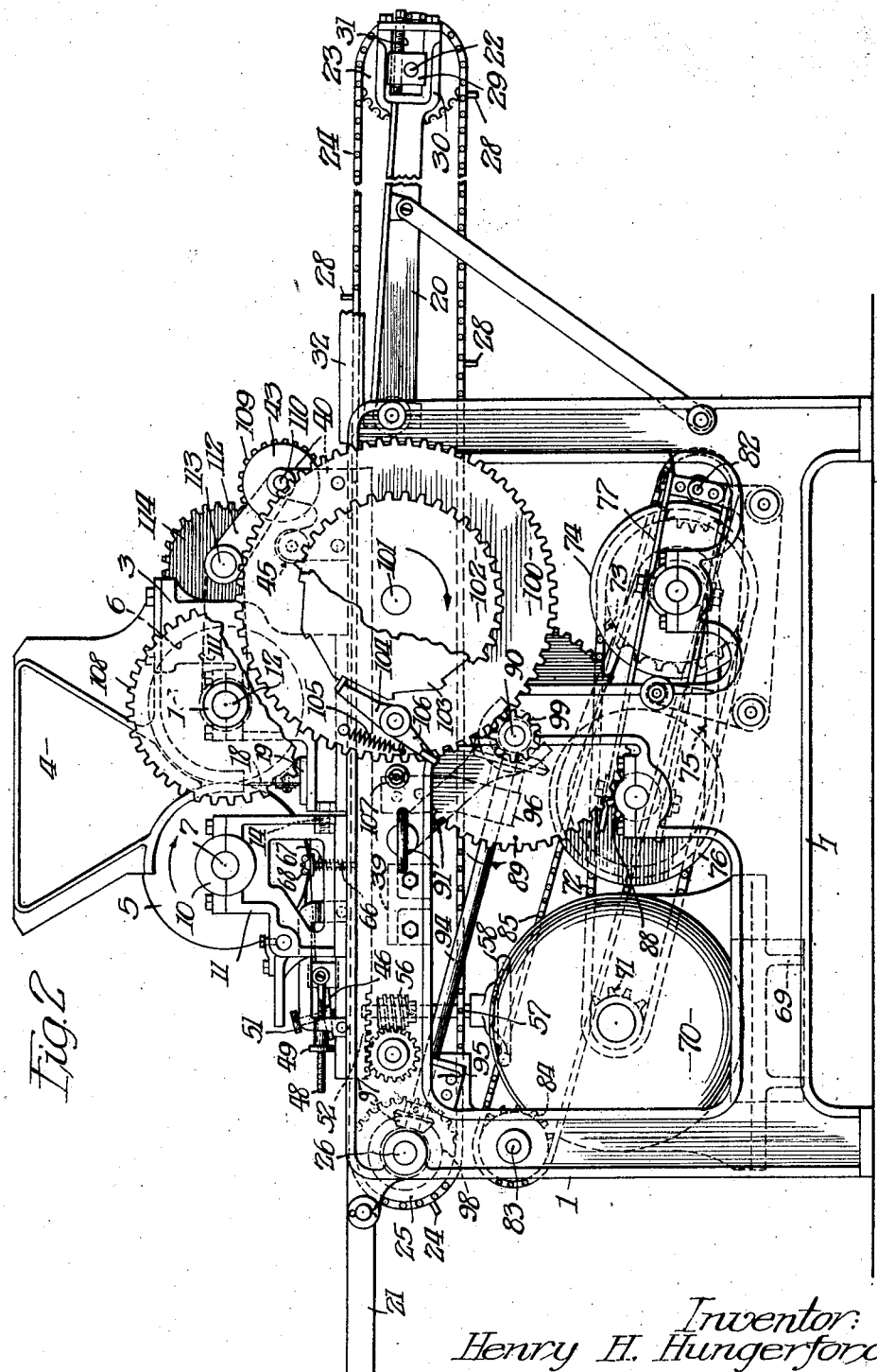

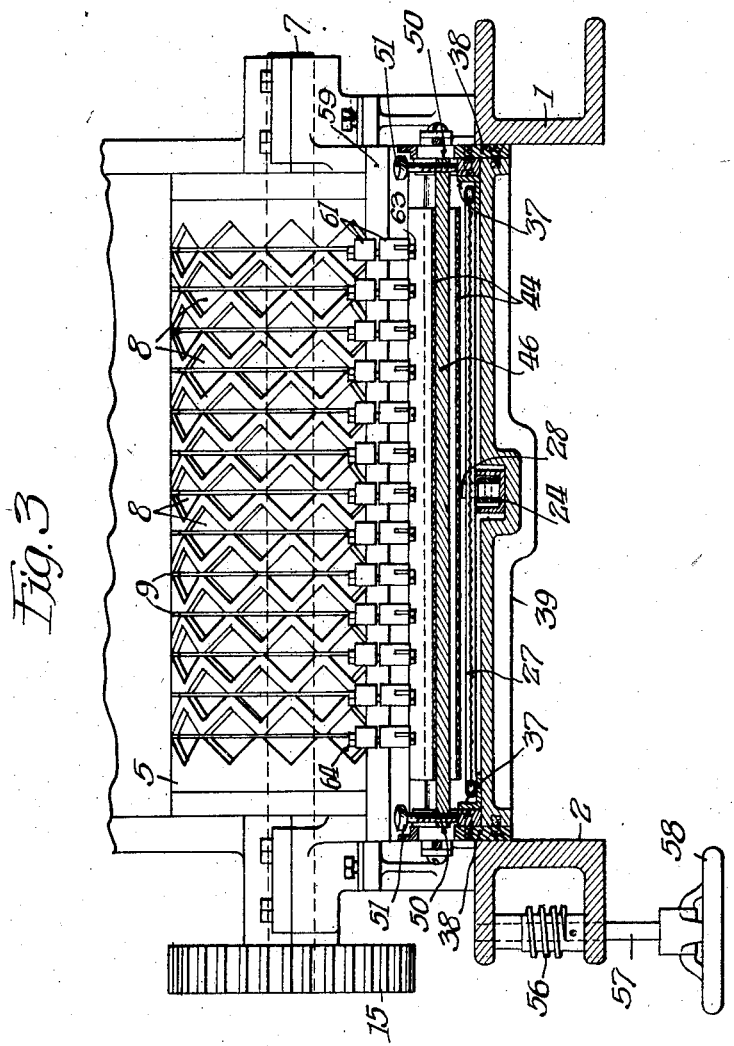

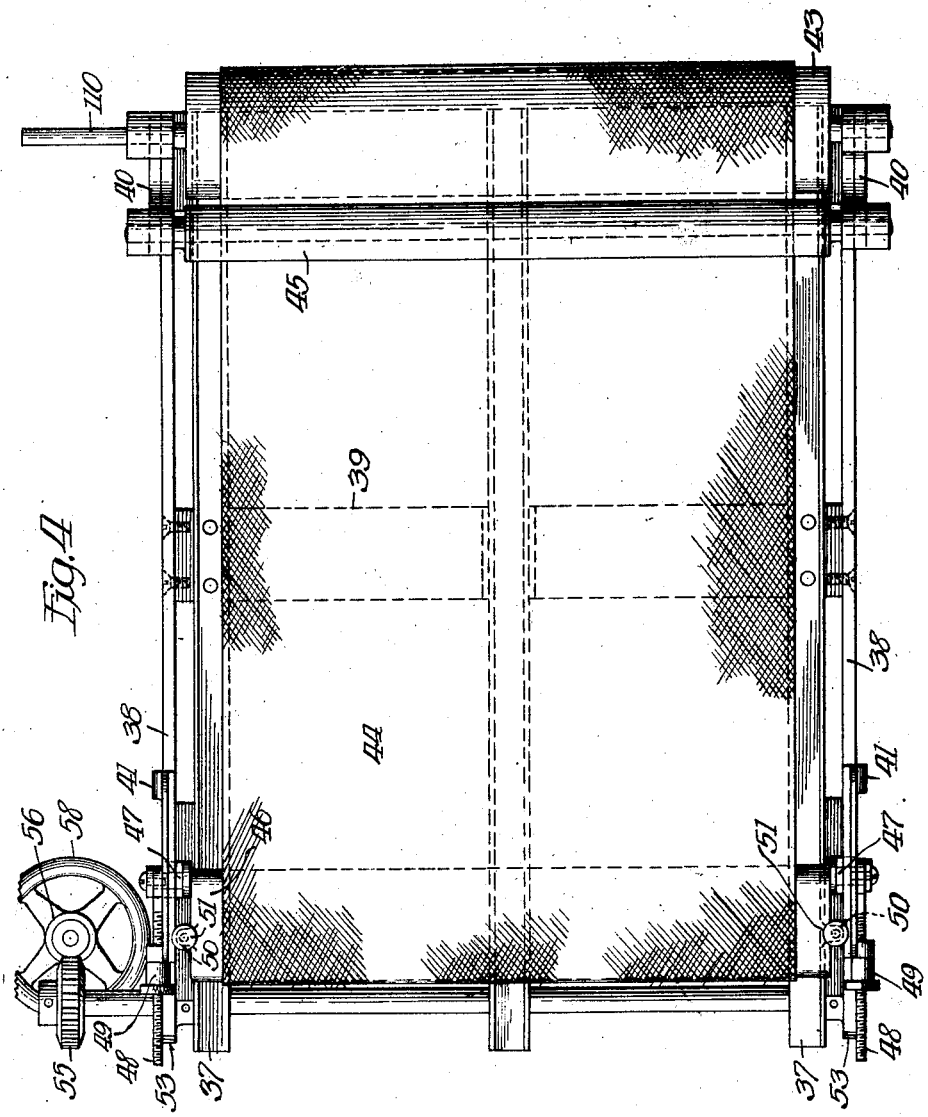

April 2, 1929. H. H. HUNGERFORD 1,707,477
CUTTING AND PANSKIP MACHINE
Filed June 8, 1923  6 Sheets-Sheet 5
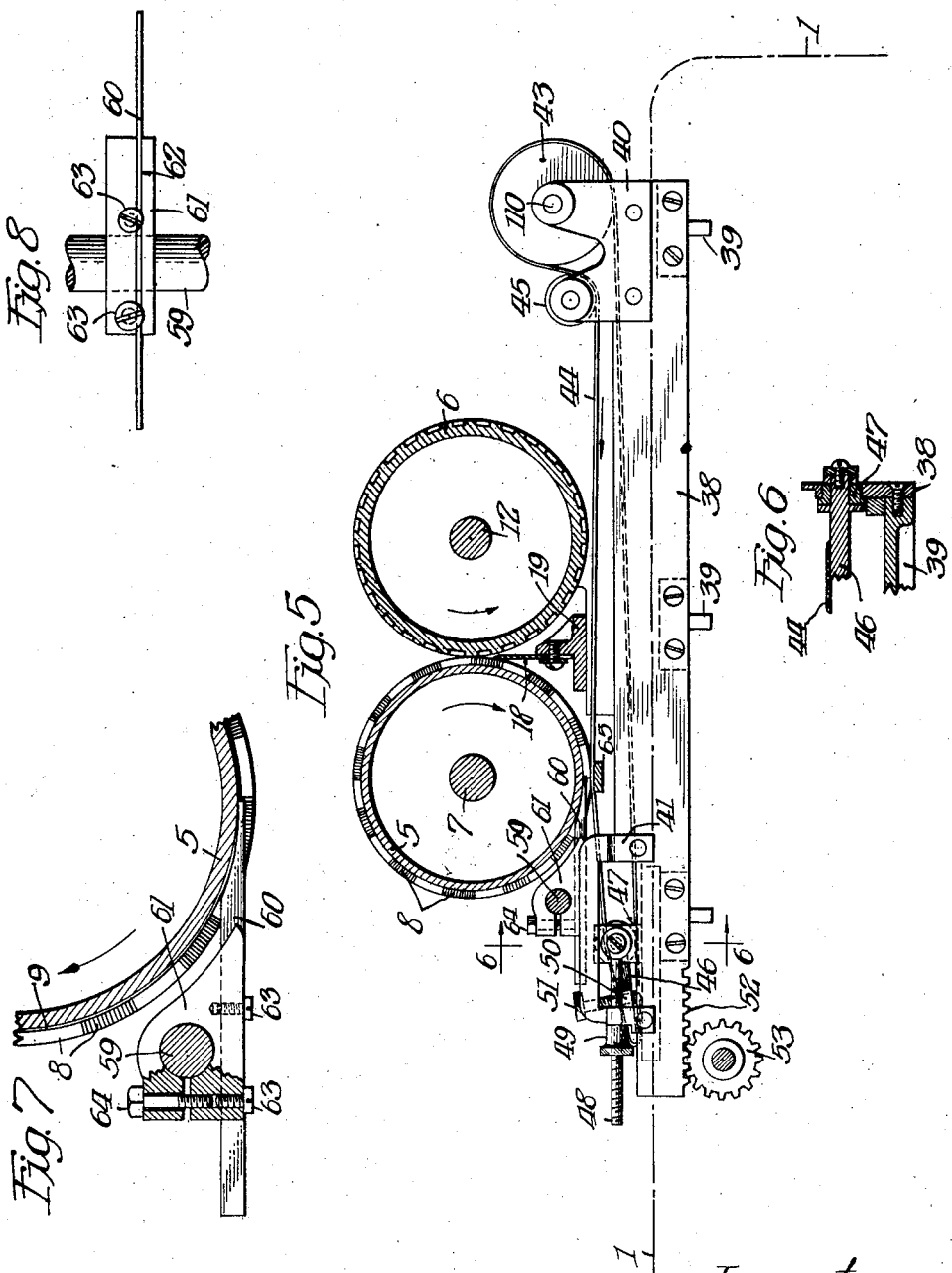
Inventor:
Henry H. Hungerford,
By Fisher, Towle, Clapp & Soans
Attys.

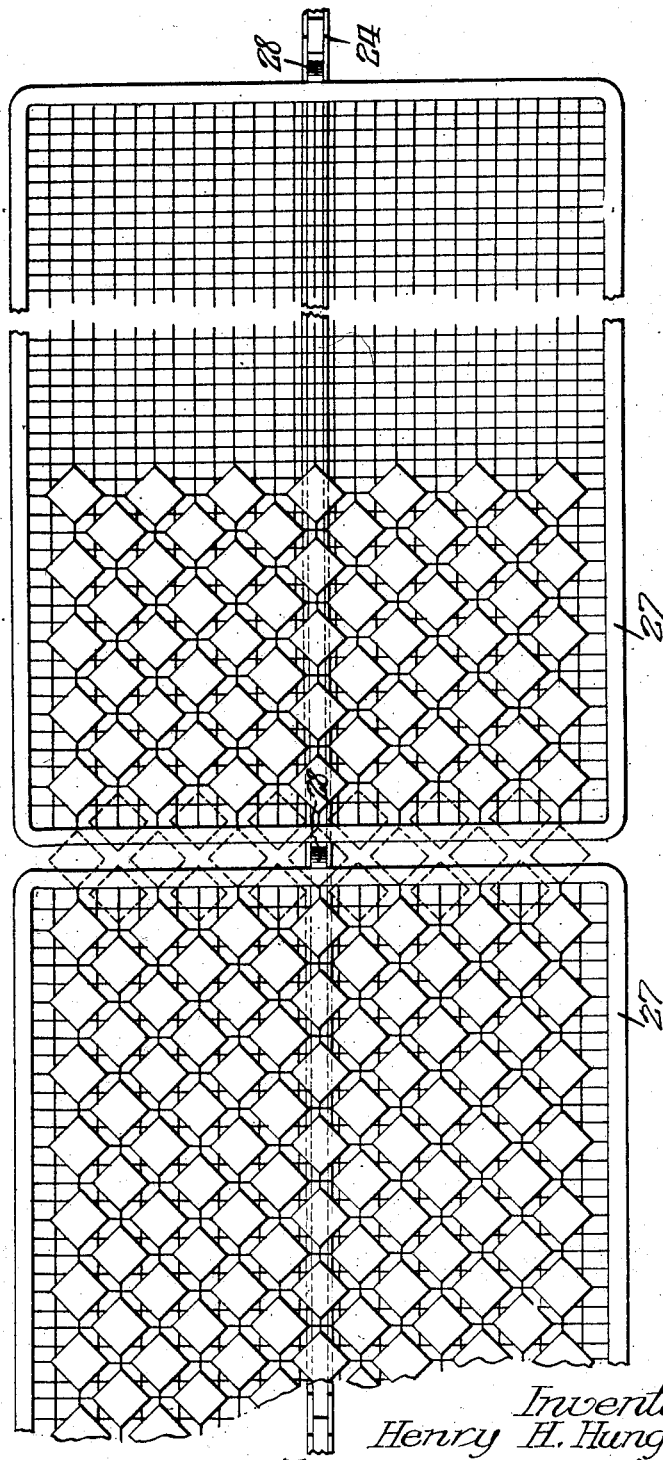

Patented Apr. 2, 1929.

1,707,477

UNITED STATES PATENT OFFICE.

HENRY H. HUNGERFORD, OF CHICAGO, ILLINOIS, ASSIGNOR TO NATIONAL BISCUIT CO., OF NEW YORK, N. Y., A CORPORATION OF NEW JERSEY.

CUTTING AND PANSKIP MACHINE.

Application filed June 8, 1923. Serial No. 644,082.

This invention relates to an improved cutting and panskip machine particularly adapted for use in the baking industry, although it is capable of employment to advantage in other associations.

It is an object to provide a device of the type stated which will present an improved construction by means of which, within a short period of time, a relatively great number of articles such as, for example, crackers, cookies, etc., may be deposited within pans with a minimum of wastage and attendance.

It is a further object to furnish a machine which will embody a mechanism by means of which articles, for example, of the type aforenamed may be cut from a layer of dough or other material, and subsequently efficiently distributed.

Another object of this invention is that of providing a construction through the medium of which the articles may be deposited within pans to best advantage, so that it is not necessary for an attendant to manually redistribute or remove certain of the articles.

An additional object is that of furnishing a machine which will efficiently perform the purposes for which it is intended, and which will also be economically and readily manufactured and easily assembled.

Other objects of the invention will in part be obvious and will in part appear hereinafter.

The invention accordingly comprises the features of construction, combination of elements, and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Fig. 1 is a plan view of one form of machine constructed within the terms of the present invention, certain portions being removed and partly broken away;

Fig. 2 a side view thereof;

Fig. 3 a transverse sectional view of the upper portion of the machine, taken on the line 3—3 of Fig. 1;

Fig. 4 a top view of the feeding mechanism which receives the cookies from the forming roll and deposits same onto the pan;

Fig. 5 a side view of the structure shown in Fig. 4 with the cookie forming mechanism thereabove in section;

Fig. 6 a fragmentary sectional view on the line 6—6 of Fig. 5;

Fig. 7 an enlarged detail view of the stripping mechanism for removing the cookies from the forming roll;

Fig. 8 a bottom view of one of the strippers; and

Fig. 9 a top view of the trays or pans in the position in which they are advanced through the machine and showing the manner in which the cookies are arranged thereon.

Referring to the drawings, the reference numerals 1 and 2 indicate the opposite side frames of the machine which are suitably connected together to form a substantial structure for supporting the mechanism of the machine. Mounted on the side frames 1 and 2 at opposite sides of the machine, are corresponding brackets 3 which support the hopper 4 for the dough which is to be formed into the cookies, the bottom of said hopper being closed by the rolls 5 and 6. The roll 5 serves as the forming roll and preferably consists of a cylindrical shell which is carried by the shaft 7 in any desirable manner and which has depressions or molds 8 in the exterior surface thereof of the size and shape of the cookies to be formed, such depressions being arranged in circumferential rows as shown in Fig. 3 with a circumferential groove 9 extending through each row of depressions. The shaft 7 of the roll 5 is journaled in bearings 10 of a pair of corresponding brackets 11 which are secured respectively to the side frames 1 and 2 in such a manner that the brackets 11 and roll 5 carried thereby may be adjusted to and from the roll 6, which latter has its shaft 12 journaled in bearings 13 of the brackets 3, such adjustment being effected by a threaded member 14 which connects the brackets 3 and 11 and is operable to move the brackets 11 to and from the brackets 3. The shaft 7 of the roll 5 projects beyond the bearing 10 at one side of the machine and carries a spur gear 15 which meshes with a similar spur gear 16 on the shaft 12 of the roll 6, so that the rolls 5 and 6 rotate at a uniform speed in opposite directions as indicated by the arrows in Fig. 5. The roll 6 serves in conjunction with the roll 5 to feed the dough from the hopper 4 and to press the dough into the depressions or molds 8 of the roll 5, the feeding function being facilitated by forming the roll 6 with closely arranged longitudinal grooves. A scraper plate 18 extends from side to side of the machine and is supported at the ends by brackets 19 which are mounted on the brackets 3 and adapted for adjustment so that the scraper plate 18 may be set up close against the surface of the roll 5 for removing the surplus dough from said roll 5, which surplus dough adheres to the roll 6, particularly on account of the fluted form of the latter, and is carried by the roll 6 back towards the hopper 4.

Extension frames 20 and 21 are provided respectively at the front and rear of the machine, the former of which has a shaft 22 mounted at the outer end and carrying a sprocket 23 around which is passed a chain 24 which extends under and beyond the rolls 5 and 6 and is engaged around the sprocket 25 on the cross shaft 26, which latter is journaled in the side frames 1 and 2. This chain serves to propel the baking pans or trays 27 through the machine to receive the cookies from the forming roll, and to this end is provided at suitable intervals with pusher fingers 28 which project upwardly from the upper stretch of the chain to engage the rear edges of the pans or trays for sliding same along a guideway which engages the lateral edges of the pans or trays. For adjusting the tension of the chain 24, the shaft 22 is journaled in blocks 29 which slide respectively in the forked outer ends 30 of the side arms of the extension frame 20 and are adjustable by tension screws 31.

The guideway for the pans is composed of three sections, the front section of which is composed of the spaced angle irons 32 which have their inner ends secured respectively to the side frames 1 and 2 and project forwardly therefrom at opposite sides of the chain 24, and the rear section of said guideway, which is just beyond the conveyor chain 24, consists of the pan 33 which is carried by the rear extension frame 21 and has the lateral edges turned up to form side flanges 34 between which the pans are confined. The forward ends of these side flanges 34 are turned outwardly as indicated at 35 to facilitate the delivery of the pans or trays onto the rear section of the guideway from the intermediate section.

The intermediate section of the guideway is composed of a pair of angle irons 37, somewhat shorter than the distance between the front and rear sections of the guideway, which are mounted on a frame which carries mechanism for transferring the cookies or cakes from the roll 5 and depositing same on the pans 27, said frame being slidable from front to rear of the machine for regulating the point of delivery of the cookies onto the pans.

This sliding frame as in Figs. 4 and 5 comprises a pair of side rails 38 which are connected together at intervals by cross members 39, so that said rails slide along the inner faces of the upper portions of the side frame members 1 and 2, and said frame is supported on the side frame members by the brackets 40 and 41, which are secured to the outer sides of the rails 38 at the front and rear ends thereof respectively and extend over onto the upper faces of the side frames 1 and 2. A roller 43 is journaled in the brackets 40 and has the endless belt or apron 44 passed therearound, the upper length of said belt being passed under the roller 45, which is also journaled in the brackets 40, and this belt extends rearwardly under the rolls 5 and 6 and turns around a tapered shoe 46 which is journaled at its forward edge in bearing blocks 47 which slide lengthwise of the machine in guideways formed by the brackets 41. These blocks 47 are adjustable along their guideways by the tension screws 48 which are operable by the nuts 49 to regulate the tension of the belt. The shoe 46 inclines downwardly from the pivot as shown in Fig. 5, and the weight of the shoe and the pull of the belt 44 thereon tends to hold same downwardly. To regulate the elevation of the rear or delivery edge of the shoe 46, the latter is provided at each end with an ear 50, through which an adjusting screw 51 is threaded, so that the lower end of the screw engages the upper surface of the rail 38.

For adjusting the sliding frame to regulate the point at which the cookies are deposited on the pans 27, the forward ends of the side rails 38 are provided on their under sides with rack teeth 52 which mesh with the gears 53 on the cross shaft 54, which shaft has the opposite ends journaled in the side frames 1 and 2. The outer end of this shaft 54 has a worm wheel 55 secured thereon and meshing with a worm 56 which is secured to the upright shaft 57 which is journaled in the side frame member 2 and provided with a hand wheel 58. By turning the hand wheel 58, the sliding frame and belt 44 thereon is adjusted longitudinally on the machine so that the point of delivery onto the pans 27 may be varied, and this worm and worm wheel adjustment serve to lock the sliding frame against displacement due to strain imposed on the sliding frame by the driving connection hereinafter described for operating the belt 44.

For removing the cookie blanks from the forming roll 5 a plurality of stripper fingers are arranged at intervals across the machine on a shaft 59 which has the ends secured to the frame members 1 and 2 and these fingers engage respectively in the circumferential grooves 9 of the forming roll. Each stripper finger consists of a small flat bar 60 which has the upper portion of the forward end cut away on a curved line as shown in Fig. 7 to correspond to the curvature of the base of the groove 9 of the roll 5, and to afford a pointed end which seats entirely within the groove 9. Each bar 60 is independently mounted on the shaft 59 by means of a bracket 61 which has a groove 62 in the underside in which the bar is adjustably clamped by the overlapping heads of the cap screws 63, and each bracket has a split bearing portion engaging the shaft 59 and clamped thereon by the adjusting screw 64.

For holding the belt 44 in proper proximity to the bottom of the roll 5, I have provided a cross bar 65 which extends under the belt 44 directly below the roll 5. This cross bar has the opposite ends provided with apertures which engage upright pins 66 on the brackets 11, each of said pins being provided with a spring 67 thereon for resiliently holding the bar 65 in the elevated position. The upper ends of the pin 66 are threaded and provided with thumb nuts 68 for limiting the elevation of the bar 65.

Mounted on a cross member 69 between the side frame members 1 and 2, is a motor 70 with a driving sprocket 71 which is connected by a chain 72 to the driving sprocket 73 of a variable speed power transmission mechanism which may be adjusted to regulate the rate of speed at which the machine is operated. This mechanism comprises in the illustrated embodiment a pair of opposed flat conical disks 74 which rotate with the sprocket 73 and form an adjustable driving member which is connected by the bevel faced belt 75 with a driven member composed of similar disks 76. A pair of rocker arms 77 are pivoted intermediate of their ends as at 78, at opposite sides of the cones 74 and 76 and are connected to collars 79 and 80 which engage the outer faces of the cones 74 and 76 respectively for inversely varying the distance between the cones 74—74 and 76—76. The forward ends of the rocker arms 77 are secured to threaded collars 81 which engage respectively right and left hand threaded portions of the shaft 82 so that rotation of said shaft swings the rocker arms 77 on their pivots 78 for regulating the separation of the cones to vary the driving ratio between the two sets of cones. For conveniently operating the shaft 82, a shaft 83 is journaled in the side frames 1 and 2 at the top and near the rear end of the machine and provided with a sprocket 84 thereon which is connected by the chain 85 with the sprocket 86 on the shaft 82, and the shaft 83 is extended at one side of the machine and provided with a hand wheel 87.

A pinion 88 which is connected to operate with the driven member 76—76 of the variable speed transmission mechanism, meshes with a gear 89 on the shaft 90, which latter is journaled in the side frame members 1 and 2 of the machine, said gear 89 preferably having a clutch connection with the shaft 90 which is controlled by the shifter 91. A bevel gear 92 is secured on the shaft 90 and meshes with a bevel gear 93 on the shaft 94 which is carried by the brackets 95 and 96 respectively at the upper and lower ends and has the bevel pinion 97 at the upper end meshing with the bevel gear 98 on the shaft 26 for operating the conveyor chain 24. Fixed on the shaft 90 at the side of the machine is a spur gear 99 which meshes with a large gear 100 which is mounted on a spindle 101 projecting outwardly from the side frame member 1. Loosely mounted on the spindle 101 at the outer side of the large gear 100 is a smaller gear wheel 102 which has a ratchet wheel 103 secured to the inner side thereof. A pawl 104 is pivoted to the large gear 100 as shown in Fig. 2 and held by the spring 105 in engagement with the teeth of the ratchet wheel 103. This pawl is provided with a trip arm 106 which is adapted upon each revolution of the large gear 100 to engage the roller 107 on the side frame 1 so that it is released from engagement with the ratchet wheel 103 and advanced into engagement with the next succeeding tooth of the ratchet wheel. The gear wheel 102 which is thus driven in an interrupted manner from the large gear 100 meshes with a spur gear 108 on the shaft 13 of the roll 6, which latter is connected by the gears 15 and 16 with the forming roll 5.

The belt 44 as hereinbefore indicated, is carried by a sliding frame which moves longitudinally of the machine, and in order to operate this belt in the various positions of adjustment of the sliding frame, a self adjusting driving connection for the belt is provided between the gear 16 of the roll shaft 12 and a gear 109 on the shaft 110 of the roller 43 around which the belt 44 is passed. To this end a toggle connection is provided between the shafts 12 and 110 comprising arms 111 and 112 which are pivoted respectively on the shafts 12 and 110 and have their outer ends connected to the spindle 113 which carries the intermediate gear 114 which meshes with the gears 16 and 109, the arrangement being such that the levers 111 and 112 maintain an angular relation which permits adjustment of the sliding frame and holds the gear 114 constantly in mesh with the gears 16 and 109.

From the foregoing it will be observed that the interrupted driving connection is applied to the feed rolls 5 and 6 and the belt 44 so that while the conveyor 24 operates continuously, the operation of the rolls 5 and 6 and the conveyor belt 44 is interrupted once during each revolution of the large gear 100. This interruption is arranged according to the length of the pans 27 and the distance between the propelling fingers 28 of the chain 24 so that the interruption occurs at the point where the adjoining ends of the two pans 27 are moving past the delivery end of the belt 44, this arrangement being provided so as to avoid the deposit of cookies on and between the end edges of the adjoining pans. Heretofore it has been customary to feed the cookies continuously and this resulted in the depositing of cookies on and between the adjoining end edges of the pans as shown by dotted lines in Fig. 9, and it was necessary for an attendant to remove the cookie blanks which were not properly placed on the pans and return same to the hopper 4. With my present invention this unnecessary labor is avoided, and the cookie blanks are properly deposited on the pan as the forming rolls and the feed belt are inoperative at the time that the ends of the pans pass the point of delivery of the feed belt 44.

Reviewing the operation it will be understood that the machine is set in motion and the driving speed is adjusted by means of the mechanism provided for this purpose. The position of the carriage supporting the conveyor 44 is also adjusted in order that the latter may deposit the articles carried upon its upper surface in proper relation to the conveyor 24, or the receiving pans carried thereby. It will be understood in connection with this latter adjustment that no difficulty will be experienced in the driving of the article conveyor, incident to the mechanism which provides a continuous drive therefor, regardless of the position of the same. In the present exemplification the hopper 4 is filled with dough, and the rolls 5 and 6 will rotate in order to express a sheet of this material and to cut dough-cakes or crackers, etc. Any surplus material will be removed by the blade 18 and returned to what might be termed the cutting point by means of the roll 6. The articles which have been cut—and, if desired, embossed by the roll 5—will be deposited upon the conveyor 44, this action being assured in the present instance by means of the stripper mechanism.

While the foregoing operations are occurring pans are being moved by the conveyor 24 under the article-carrying conveyor and past the discharge end of the latter. Due to the driving mechanism the movement of the article conveyor will be interrupted upon a pan reaching a position where its rear end is adjacent the discharge end of the conveyor 44, and this interruption of movement will be continued until such time as the forward end of the next succeeding pan has reached a point adjacent the discharge end of this conveyor.

It will be understood that the various adjustments suggested, as well as any additional adjustments desired, may be incorporated in the machine for assuring the continued proper operation of the same, and the cutting and drive mechanism may be altered in order, first, to furnish different sizes and types of crackers, etc., and secondly, to vary the interval of rest of the article conveyor to adapt the machine to the various types of articles, as well as different sizes and types of pans.

From the foregoing it will be appreciated that the objects of this invention are accomplished, and since certain changes may be made in the above construction, and different embodiments of the invention could be made, without departing from the scope thereof, it is intended that all matter contained in the above description, or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim as my invention:

1. A machine of the class described, having a panskip mechanism including an article conveyor, an article-receiving conveyor, means for moving said latter conveyor, and means for constantly moving said first conveyor for relatively long intervals of time and periodically interrupting the movements of the same for relatively short intervals.

2. A machine of the class described, having a panskip mechanism including an article conveyor, means for continuously moving the same for relatively long intervals of time, an article-receiving conveyor, means for moving said latter conveyor at a substantially constant speed, and means for periodically interrupting the movements of the first-named conveyor for relatively short periods of time.

3. In a machine of the class described, the combination of a roll for forming cookies and the like, a conveyor for passing pans successively under the roll to receive the cookies formed by the latter, operating mechanism for the roll, and means for temporarily interrupting the operation of the roll as the pans are passed thereunder so as to interrupt deposit of cookies as the adjoining ends of successive pans pass the point at which the cookies are deposited on the pans.

4. In a machine of the class described, the combination of a roll for forming cookies and the like, guideways along which pans are movable under the roll to receive the cookies therefrom, a continuously operable propelling mechanism for advancing the pans successively along the guideways, and mechanism for intermittently operating the roll so that the latter is rendered inoperative as the adjoining ends of successive pans pass the point at which the cookies are deposited thereon.

5. In a machine of the class described, the combination of a roll for forming cookies and the like, continuously operable mechanism for advancing pans successively to receive the cookies from said roll, and mechanism for intermittently operating the roll so that each period of operation thereof occurs as a pan is passing the point at which the cookies are deposited thereon.

6. In a machine of the class described, the combination of a roll for forming cookies and the like, continuously operable mechanism for supplying pans successively to receive the cookies from the forming roll, and mechanism for intermittently operating the forming roll comprising a pawl and ratchet drive, and means for temporarily disengaging the pawl from the ratchet wheel at predetermined intervals.

7. In a machine of the class described, the combination of mechanism for forming cookies and the like, means moving at a substantially constant speed for supplying pans successively to receive the cookies formed by said mechanism, a feeding device operating constantly over long periods for receiving the cookies from the cookie forming mechanism and depositing the same on the pans, and means for rendering the feeding device inoperative for a relatively short interval and as the adjoining ends of the successive pans pass the point at which the cookies are deposited thereon.

8. In a machine of the class described, the combination of mechanism for forming cookies and the like, means for supplying pans successively to receive the cookies formed by said mechanism, an endless apron operating to receive the cookies from the cookie forming mechanism and deposit same on the pans, and mechanism for intermittently operating the forming mechanism and the apron so as to stop the forming of the cookies and the feeding of same onto the pans as the adjoining ends of successive pans pass the point at which the cookies are deposited thereon by the apron.

9. In combination, mechanism for forming cookies and the like, a pan-conveying mechanism for supplying pans successively to receive the formed cookies, a moving apron for transferring said cookies from said forming mechanism to said conveying mechanism, means for periodically interrupting the movement of said apron, and manually-controlled means for bodily shifting said apron to adjust the point of delivery of the cookies with respect to the pans.

10. In combination, mechanism for forming cookies, means including a panskip mechanism for supplying pans successively to receive the formed cookies, means arranged between said pan-supplying means and forming means for transferring the cookies from the latter to the pans of the former, and manually-controlled means for bodily shifting said transferring means along the path of movement of the pans to adjust the point of delivery of said cookies with respect to said pans.

11. In a machine of the class described, the combination of a roll for forming cookies and the like, a hopper for supplying dough to the forming roll, conveying mechanism for supplying pans successively to receive the cookies formed by said roll, an intermittently-moving apron adapted to receive the cookies from the forming roll and deposit same on the pans, and means whereby a relative adjustment of the apron and the conveying mechanism is afforded for varying the point of delivery of the cookies onto the pans.

12. In a machine of the class described, the combination of mechanism for forming cookies and the like, conveying means for supplying pans successively to receive the cookies formed by said mechanism, an endless apron movable longitudinally of and in the same direction as said conveying means to receive the cookies from the forming mechanism and deposit same onto the pans, and manually-controlled means for bodily moving the apron to adjust the delivery end thereof for a limited distance along the path of movement of said pans.

13. In a machine of the class described, the combination of a roll for forming cookies and the like, a receptacle for supplying dough to the forming roll, guideways along which pans are movable, a continuously operable propelling mechanism for advancing pans successively along the guideways, an endless apron operable between the roll and the pans for receiving the cookies from the roll and depositing same on the pans, stripper fingers cooperating with the roll to remove the cookies therefrom, means for adjusting the apron along the path of movement of the pans, and driving mechanism for the roll and apron for intermittently operating same so as to temporarily discontinue the feeding of cookies onto the pans as the adjoining ends of successive pans pass the point at which the cookies are deposited thereon.

14. A device of the character described, including, in combination, a shoe, a roll, a carriage supporting said shoe and roll, a conveyor also supported by said carriage and passing around said shoe and roll, a second conveyor adapted to receive material discharged from said first-named conveyor, means for moving both of said conveyors, means for shifting said carriage, and means for moving said shoe and roll away from and towards each other.

15. A device of the character described, including, in combination, a shoe, a roll, a carriage supporting said shoe and roll, a conveyor also supported by said carriage and passing around said shoe and roll, a second conveyor adapted to receive material discharged from said first-named conveyor, means for moving both of said conveyors, means for shifting said carriage, means for moving said shoe and roll away from and towards each other, and means for swinging said shoe towards and away from said last-named conveyor.

16. A dough-handling mechanism, including, in combination, a pan conveyor, a material conveyor adapted to discharge onto said pan conveyor, means for discharging material onto said second conveyor, means for operating said conveyors, means for bodily shifting the material conveyor relatively to said pan conveyor to vary the point of delivery of the material onto said pans, and means for preventing a subsequent shifting of said point.

17. A dough-handling mechanism, including, in combination, a pan conveyor, a material conveyor adapted to discharge onto said pan conveyor, means for discharging material onto said material conveyor, means for operating said conveyors, and means for shifting the point of discharge of said first-named means onto said material conveyor and shifting the point of discharge of the latter onto said pan conveyor.

18. A device of the character described, including, in combination, a carriage, a conveyor bodily supported by said carriage, means for discharging material onto said conveyor, a second conveyor adapted to receive the material from said first-named conveyor, means for operating both of said conveyors, means for shifting said carriage relatively to said material-discharge means and second conveyor, and means for preventing a subsequent shifting of said parts.

19. A dough-handling mechanism, including a frame, a carriage movable along said frame, material-delivering mechanism associated with said frame, a conveyor bodily supported by said carriage and receiving material from said last-named means, a conveyor adapted to support pans to receive material from said first-named conveyor, means for constantly driving the latter, and means for driving the first-named conveyor continuously over relatively long periods of time and stopping the same for relatively short periods.

20. A dough-handling mechanism, including, in combination, material-supplying means, a belt conveyor arranged adjacent thereto and receiving the material therefrom, a shiftable carriage supporting said conveyor, a substantially fixed drive for operating said material-delivering means, a gear associated with said drive, a gear associated with said carriage and connected with said conveyor to drive the same, a shaft supporting an idler gear having its teeth in mesh with both of said gears, and a pair of links, each having their inner ends connected with said shaft, the outer end of one being connected with said drive, the outer end of the other being connected with the shaft-supporting said conveyor gear.

21. A dough-handling mechanism, including, in combination, material-delivering means, a conveyor arranged adjacent thereto and receiving material therefrom, a second conveyor adapted to move pans, the first conveyor discharging into said pans, means for continuously driving said latter conveyor, a pawl and ratchet mechanism for connecting said last-named means with said first-named conveyor, and means for periodically tripping said mechanism during the continued driving of said pan conveyor to periodically interrupt the driving of said material conveyor.

22. A dough-handling mechanism, including, in combination, material-delivering means, a conveyor arranged adjacent thereto and receiving material therefrom, a second conveyor adapted to move pans, the first conveyor discharging into said pans, means for continuously driving said latter conveyor, clutch mechanism for connecting said material-delivering mechanism and conveyor with the mechanism driving said pan conveyor, and means for periodically disconnecting said clutch mechanism whereby, during the continued operation of said pan conveyor, to periodically cause a cessation of operation of the elements operated thereby.

23. A dough-handling mechanism, including, in combination, a conveyor for moving pans, means for continuously driving the same, a material-discharging mechanism, a conveyor arranged adjacent thereto and receiving material therefrom, and means for connecting said mechanism and latter conveyor with said driving means, said means including a pawl and ratchet assembly, and means for periodically rendering said assembly inoperative whereby, during the continued operation of said pan conveyor, the driving of said material-delivering mechanism and conveyor will be periodically interrupted.

24. A device of the character described, including, in combination, a material conveyor, a conveyor arranged adjacent thereto and adapted to carry the pans which receive material therefrom, means for moving both of said conveyors in similar directions, means for periodically interrupting the movement of said material conveyor, and manually-controlled means for bodily shifting one of said conveyors to permit the same to be moved longitudinally of the other conveyor and to adjust the point of delivery of the material into the pans.

25. A device of the character described, including, in combination, a material conveyor, a conveyor arranged adjacent thereto and adapted to carry the pans which receive material therefrom, means for moving both of said conveyors in similar directions, means for periodically interrupting the movement of said material conveyor, and manually-controlled means for bodily shifting said material conveyor to permit the same to be moved longitudinally of the other conveyor and to adjust the point of delivery of the material into the pans.

26. A device of the character described, including, in combination, a material conveyor, a conveyor arranged adjacent thereto and adapted to carry the pans which receive material therefrom, means for moving both of said conveyors in similar directions, means for periodically interrupting the movement of said material conveyor, a movable carriage for supporting the entire body of said material conveyor longitudinally of the other conveyor, and manually-controlled means for moving said movable carriage to adjust the point of delivery of the material into the pans.

27. A device of the character described, including, in combination, a carriage, rolls supported by said carriage, a conveyor passing around and bodily supported by said rolls, means adapted to discharge material onto said conveyor, a second conveyor adapted to carry pins which receive the material from said first-named conveyor, means for moving both of said conveyors in similar directions, means for periodically interrupting the discharge of material onto said material conveyor and the movement of said material conveyor, and means for adjusting said carriage longitudinally of said second conveyor whereby to adjust the point of delivery of the material into said pans.

28. A device of the character described, including, in combination, a conveyor, a second conveyor adapted to discharge onto said first-named conveyor, means for discharging material onto said second conveyor, means for constantly moving the first conveyor and moving said second conveyor constantly over relatively long intervals of time and for interrupting the movement of said second conveyor for relatively short intervals, the direction of movement of both conveyors being similar, and means for adjusting the point of discharge of said second conveyor onto said first conveyor.

HENRY H. HUNGERFORD.